UNITED STATES PATENT OFFICE.

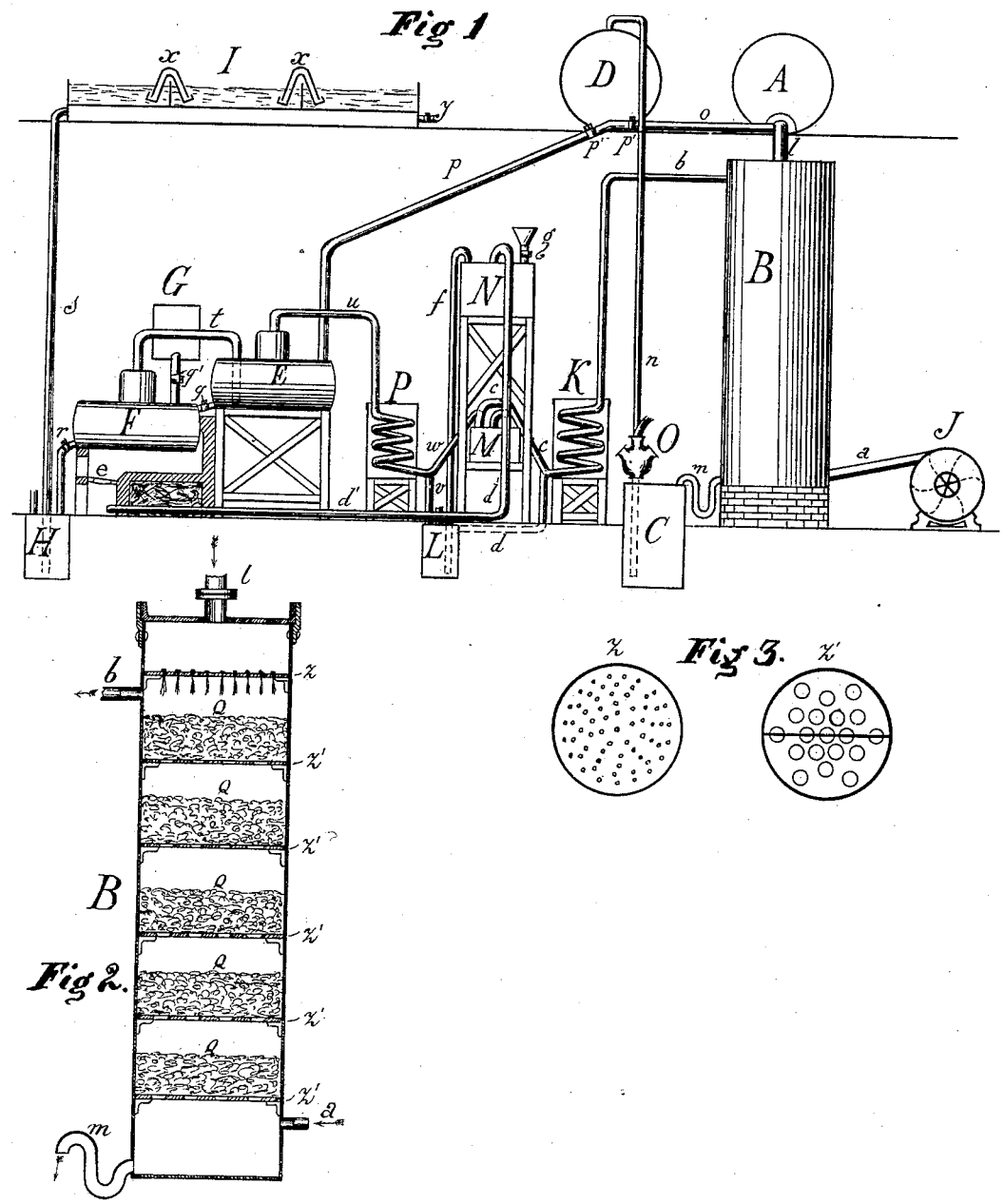

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

PROCESS OF OBTAINING AMMONIA.

SPECIFICATION forming part of Letters Patent No. 342,237, dated May 18, 1886.

Application filed August 4, 1885. Serial No. 173,512. (No model.)

*To all whom it may concern:*

Be it known that I, JOSEPH VAN RUYMBEKE, a citizen of Belgium, residing at Chicago, in the county of Cook and State of Illinois, have invented certain new and useful Improvements in Processes for Producing Ammoniated Gases from Organic Liquids, which are fully set forth in the following specification, reference being had to the accompanying drawings, forming a part hereof.

The object of my invention is to produce rapid decomposition through putrid fermentation in closed vessels, without the escape of noxious gases or odors of liquids containing animal substances, for the production and collection therefrom of ammonia compounds. Heretofore such liquids have been decomposed through fermentation by being exposed to atmospheric influence in large open cisterns—a slow, expensive, and very offensive operation, by which is incurred the loss of a large portion of the ammonia obtainable by my process. These results are obtained by the use of an inclosed apparatus of special construction, in which the liquid is first raised to an elevation, from which it is then sprayed by gravity or otherwise into a current of air passing upward through the apparatus from its base, and is passed through a body of porous material, as shavings, previously prepared by saturation with liquid in a state of putrid fermentation. When the decomposition is completed, the liquid is passed into a closed vessel, together with steam containing ammonia, which condenses and mixes with the liquid, whereby the volatile ammonia compounds are volatilized and collected in refrigerating and sulphuric-acid condensers into which these gases have passed. When this operation is completed, the non-volatile ammonia compounds remaining in said closed vessel are then passed into a second closed vessel, where sufficient lime or any like suitable alkali is added, ascertained by chemical test, sufficient, with the application of heat, to disengage the remaining ammonia, and it is this steam containing ammonia that is used in the treatment of the decomposed liquid when passed into the closed vessel in the earlier operation above mentioned. All noxious gases escaping through the condensers are collected and burned.

My apparatus consists of a distributing tank or reservoir, A, Figure 1, connected with an air or gas tight vertical cylinder, B, made of any suitable material and capacity, provided with a series of perforated disks or shelves, $z'$, placed at about regular intervals between its ends. Upon said disks are placed wood shavings or other suitable porous substances, which are previously saturated with liquids containing organic substances in the course of putrid decomposition, as shown in Fig. 2. Fig. 3 is a plan view of disks $z$ and $z'$.

The upper disk, $z$, has fibrous substances, as tow or strings, hanging from beneath it, in order more completely to break the liquid into as minute divisions as possible. Upon said shavings, &c., is thus passed a stream of liquid containing animal organic substances in solution, and at the same time a current of air is forced into said cylinder from its base upward through said charged or saturated shavings and falling liquid, which together impart a rapid decomposing effect upon the organic liquid. Said organic liquid is passed from the reservoir A through the head of the cylinder B by means of a connecting-pipe, $l$, and below the upper perforated disk, $z$, there is an exit-pipe, $b$, through which passes the air-current charged with free ammonia collected from said liquid, which connects the cylinder B with a refrigerating-condenser, K, from which a pipe, $e$, connects with a chemical condenser, M, and from the lowest point of the refrigerating-condenser a pipe, $d$, with tank L, which tank receives the condensed products. Below the lowest perforated disk, $z$, there is a pipe, $a$, connected with a fan, J, or other suitable apparatus, to supply the air, and at or near the bottom of the cylinder B there is an exit-pipe, $m$, connecting with the tank C, into which the decomposed liquid flows. From said tank C the liquid is raised by pump O through pipe $n$ into a distributing-reservoir, D, from which, when not sufficiently decomposed, it may be again passed into decomposer B by means of pipe $o$ or through pipe $p$ into boiler E. Said pipes $o$ and $p$ form one continuous pipe connecting reservoirs A and D, cylinder B, and boiler E, and are provided with gates or cocks $p'$ on each side of the branch connecting them with tank D, by means of which the liquid may be passed either to the boiler E or cylinder B. When the liquid is sufficiently decomposed, it is passed from the tank D through pipe $p$ into boiler E, where it is heated by means of steam passed into it through pipe $t$ from boiler F, where the steam is generated in the presence of lime supplied from mixer G in the form of a thick milk of lime by means of a pipe, $q'$. The condensation of this ammonia-charged steam thus generated rapidly raises the liquid in tank or boiler E to the boiling-point, whereby most of the free ammonia, carbonate of ammonia, and sulphide of ammonia are volatilized, and by means of pipe $u$ are passed through refrigerating-condenser P, where the condensable products are collected through pipe $v$ into receiving-tank L, and the uncondensed ammonia-gases through the pipe $w$ into the sulphuric-acid condenser M. After the ammonia and other gaseous products have been collected from the liquids in boiler E the remaining liquids are passed into the boiler F, where sufficient milk of lime is added to decompose any ammonia salts remaining therein, which is converted into steam and used and collected, as already stated. When the liquid in boiler F is exhausted of all its collectable products, it is emptied through pipe $r$ into siphon-tank H, from whence it is passed by means of pipe $s$ into the water-chamber of drying-pans I, where it is used for drying the sulphates collected throughout the previous operations. The condensed products from condensers K and P, which are collected in siphon-tank L, are raised by means of pipe $f$ into saturating-tank N, which is supplied with sulphuric acid by means of fauceted funnel $g$.

Tanks M and N are connected with furnace of boiler F by means of pipe $d'$, through which pass all volatile products for combustion.

The ammonia compounds condensed in the refrigerating-condenser may be turned into sulphates by the addition of sulphuric acid, or be otherwise utilized as carbonates or sal-ammoniac.

What I claim is—

1. The process herein described of producing decomposition of liquids containing organic substances in solution for the production of ammonia, by showering them through forced currents of air, within closed vessels, over porous substances charged or saturated with putrid ferments, substantially as specified.

2. The process herein described of producing ammonia compounds from liquids containing organic substances in solution, by subjecting them, in closed vessels, to rapid putrid fermentation by showering them through forced currents of air over porous substances charged or saturated with putrid ferments, substantially as specified.

3. The process of producing, collecting, and separating ammonia compounds, in closed vessels, from liquids containing animal organic substances in solution, by forcing a current of air through such liquids while being sprayed upon porous material charged or saturated with putrid ferments, so that the said current of air, ferments, and sprayed liquids are brought into intimate contact, after which the said current of air is made to traverse a refrigerating and sulphuric-acid condenser, whereby the condensable products are separated and collected in a receiving-tank, and the volatile products are collected in a sulphuric-acid condenser, substantially as specified.

4. The process herein described of producing ammonia compounds from liquids containing organic substances in solution, by subjecting them, in closed vessels, to rapid putrid fermentation by showering them through forced currents of air over porous substances charged or saturated with putrid ferments, then subjecting the putrefied liquid to heat in a closed boiler, and collecting the gases in refrigerating and sulphuric-acid condensers, substantially as specified.

5. The process herein described of producing ammonia compounds from liquids containing organic substances in solution, by subjecting them, in closed vessels, to rapid putrid fermentation by showering them through forced currents of air over porous substances charged or saturated with putrid ferments, and subjecting the putrefied liquid to heat in closed boilers, and then subjecting such ammonia containing steam and air to refrigerating and sulphuric-acid condensation, substantially as specified.

6. The process herein described of producing ammonia compounds from liquids containing organic substances in solution, by subjecting them, in closed vessels, to rapid putrid fermentation by showering them through forced currents of air over porous substances charged or saturated with putrid ferments, and subjecting the putrefied liquid mixed with an alkali to heat in a boiler, and then subjecting said currents of air and steam to refrigerating and sulphuric-acid condensation, substantially as specified.

7. The process herein described for producing ammonia compounds from liquids containing organic substances in solution by subjecting them, in closed vessels, to rapid putrid fermentation by showering them through forced currents of air over porous substances charged or saturated with putrid ferments, and subjecting the putrefied liquid to heat derived from steam driven into the liquid, and then further mixing said liquid in a second boiler with an alkali while subjected to heat, and then subjecting such ammonia containing steam and air to refrigerating and sulphuric-acid condensation, substantially as specified.

JOSEPH VAN RUYMBEKE.

Witnesses:
WILLIAM F. JOBBINS,
WM. ZIMMERMAN.